L. SCHOPPER.
METHOD FOR TESTING THE TENSILE STRENGTH OF ELASTIC MATERIALS.
APPLICATION FILED JAN. 6, 1908.

922,524.

Patented May 25, 1909.

Witnesses
S. Ford
A. Morrill

Inventor
Louis Schopper
by R. Huddle
Attorney

UNITED STATES PATENT OFFICE.

LOUIS SCHOPPER, OF LEIPZIG, GERMANY.

METHOD FOR TESTING THE TENSILE STRENGTH OF ELASTIC MATERIALS.

No. 922,524.  Specification of Letters Patent.  Patented May 25, 1909.

Application filed January 6, 1908. Serial No. 409,587.

*To all whom it may concern:*

Be it known that I, LOUIS SCHOPPER, a mechanician, a subject of the German Emperor, residing at Leipzig, in the German Empire, have invented certain new and useful Improvements in Methods for Testing the Tensile Strength of Elastic Materials, of which the following is a specification.

This invention relates to an improved method of testing the tensile strength of highly elastic materials.

The testing of highly elastic materials with regard to their extension under the action of a measured load or strain is attended with difficulties when the methods hitherto known are used, owing to the fact that when the grippers holding a strip of material to be tested are moved apart the extension of the strip continues for an indefinite distance within the grippers thus falsifying the indications and at a certain limit the strip is liable to slip from the grippers. If the latter are too strongly compressed the material is crushed.

The present invention consists in testing the material in the form of an endless band, which is passed about a pair of pins or the like spaced apart and movable relatively from each other, and the material is not engaged by grippers or similar compression surfaces.

The annexed drawing illustrates the invention in which—

Figure 1:
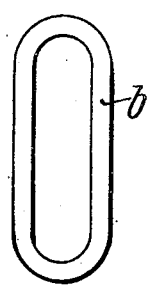
Figure 3:
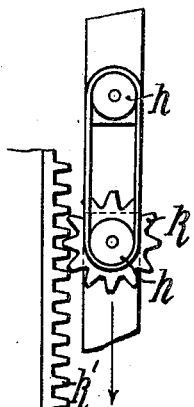
Figure 4:
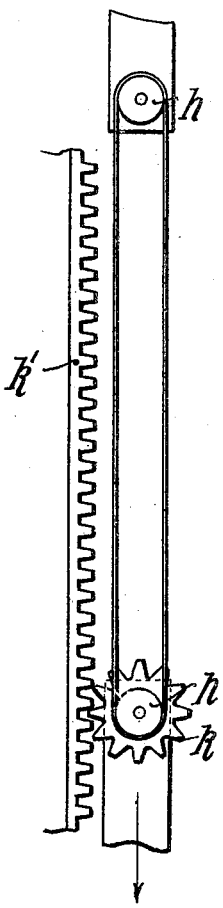
Figure 5:
Figure 2:
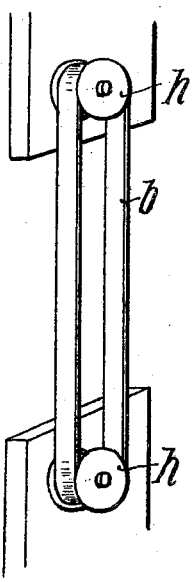
Figure 6:

Figure 1 represents the endless band of the elastic material to be tested. Fig. 2 shows the pins or the like, on which the material is placed, moved apart. Fig. 3 shows the device where rotatable pins are used. Fig. 4 shows the same with the band stretched. Figs. 5 and 6 illustrate the thickness of the band respectively before and while being stretched.

In the case of india-rubber, for example, an annular strip, or elongated ring $b$, may be stamped out of a sheet of rubber of uniform thickness, and placed upon pins $h$ (Fig. 2), the latter being thereupon moved apart so that the ring is uniformly stretched and thus tested to breaking point. It is desirable to use rotatable pins, so that in case of unequal stretching of the two halves an equalization immediately takes place.

Tests have shown, that a highly elastic ring stretched in the manner described is not stretched throughout its entire length, but that the ring, originally of perfectly uniform cross-section (Fig. 5), becomes thinner at the sides and remains thick on the pins (Fig. 6), so that the test does not extend to the parts on the pins. It is, however, desirable that the whole of the material should be equally subjected to the test, and this can be done by continuously rotating the pins during the test. Apparatus suitable for this purpose is shown in Figs. 3 and 4.

The upper pin $h$ is mounted on a stationary axle, and the lower pin $h^1$ is vertically movable. Fixed to the lower pin is a gear-wheel $k$ in mesh with a fixed rack $k^1$. Downward movement of the lower pin causes the gear-wheel to roll on the rack, so that the pins with the ring $b$ thereon are rotated while the ring is being stretched.

What I claim as my invention and desire to secure by Letters Patent of the United States is:—

The improved method of testing the tensile strength of elastic material consisting in placing an endless strip of said material about a pair of rotatable pins and stretching the strip by moving the pins apart while revolving the pins.

In witness whereof I have signed this specification in the presence of two witnesses.

LOUIS SCHOPPER.

Witnesses:
  RUDOLPH FRICKE,
  SOUTHARD P. WARNER.